United States Patent
Schmid

(10) Patent No.: US 12,481,006 B2
(45) Date of Patent: Nov. 25, 2025

(54) PROTECTION DEVICE FOR MECHANICALLY PROTECTING A CONTACT ELEMENT, AND MEASUREMENT METHOD AND MEASUREMENT ARRANGEMENT FOR THE ASSEMBLY OF AN ELECTRICAL PLUG-IN CONNECTOR

(71) Applicant: ROSENBERGER HOCHFREQUENZTECHNIK GMBH & CO. KG, Fridolfing (DE)

(72) Inventor: Johannes Schmid, Altoetting (DE)

(73) Assignee: Rosenberger Hochfrequenstechnik Gmbh & Co. KG, Fridolfing (DE)

( * ) Notice: Subject to any disclaimer, the term of this patent is extended or adjusted under 35 U.S.C. 154(b) by 183 days.

(21) Appl. No.: 18/557,460

(22) PCT Filed: Apr. 26, 2022

(86) PCT No.: PCT/EP2022/061079
§ 371 (c)(1),
(2) Date: Oct. 26, 2023

(87) PCT Pub. No.: WO2022/229202
PCT Pub. Date: Nov. 3, 2022

(65) Prior Publication Data
US 2024/0426946 A1      Dec. 26, 2024

(30) Foreign Application Priority Data
Apr. 30, 2021   (DE) .......................... 102021111255.9

(51) Int. Cl.
*G01R 31/66*      (2020.01)
*H01R 13/447*    (2006.01)

(52) U.S. Cl.
CPC ........... *G01R 31/66* (2020.01); *H01R 13/447* (2013.01)

(58) Field of Classification Search
CPC ...... G01R 31/66; H01R 13/447; H01R 43/20; H01R 2201/20
See application file for complete search history.

(56) References Cited

U.S. PATENT DOCUMENTS 5,859,534 A     1/1999  Saijo
8,858,261 B2 * 10/2014  Bauerle ............... H01R 9/0527
                                                            439/607.41
(Continued)

FOREIGN PATENT DOCUMENTS

DE    4002193 A1    8/1991
DE   10351603 A1 *  6/2004   ............ H01R 43/20
(Continued)

OTHER PUBLICATIONS

German Search Report issued in App. No. DE102021111255, dated Jan. 26, 2022, 9 pages.
(Continued)

*Primary Examiner* — Akm Zakaria
(74) *Attorney, Agent, or Firm* — Koffsky Schwalb LLC

(57) ABSTRACT

The invention relates to a protection device (8) for mechanically protecting at least one contact element (4, 5) of an electrical plug-in connector (1), having a protective cover (9) for covering an end face (10) of the contact element (4, 5). The protective cover (9) has an access opening (11) for passing through a mating contact element of an electrical mating plug-in connector in order to electrically and mechanically connect the mating contact element to the contact element (4, 5). It is provided that the protective cover (9) has in addition to the access opening (11) at least one measuring access point (12), through which a measuring tip of a measuring probe (13) can be passed in order to contact the end face (10) of the contact element (4, 5) for detecting its axial position ($P_A$) by measurement.

21 Claims, 4 Drawing Sheets

(56) References Cited

U.S. PATENT DOCUMENTS

| | | | |
|---|---|---|---|
| 10,873,153 B2* | 12/2020 | Denzinger | H01R 13/53 |
| 11,532,918 B2 | 12/2022 | Yang | |
| 12,107,376 B2* | 10/2024 | Sorg | H01R 43/048 |
| 2019/0260150 A1* | 8/2019 | Costello | H01R 13/62938 |
| 2020/0088781 A1 | 3/2020 | Toquet | |

FOREIGN PATENT DOCUMENTS

| | | |
|---|---|---|
| DE | 69434005 T2 | 2/2005 |
| DE | 102020201148 A1 | 8/2020 |
| JP | S56161792 U | 12/1981 |
| JP | H0765923 A | 3/1995 |
| JP | H08264254 A | 10/1996 |

OTHER PUBLICATIONS

International Search Report and Written Opinion issued in App. No. PCT/EP2022/061079, dated Aug. 26, 2022, 12 pages.

* cited by examiner

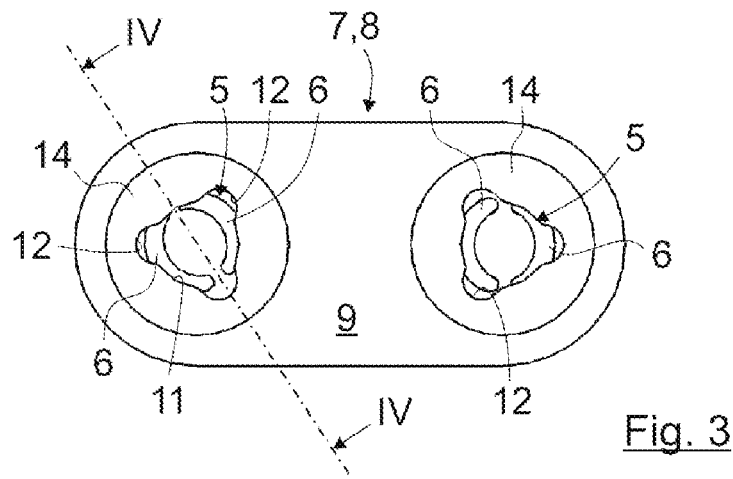
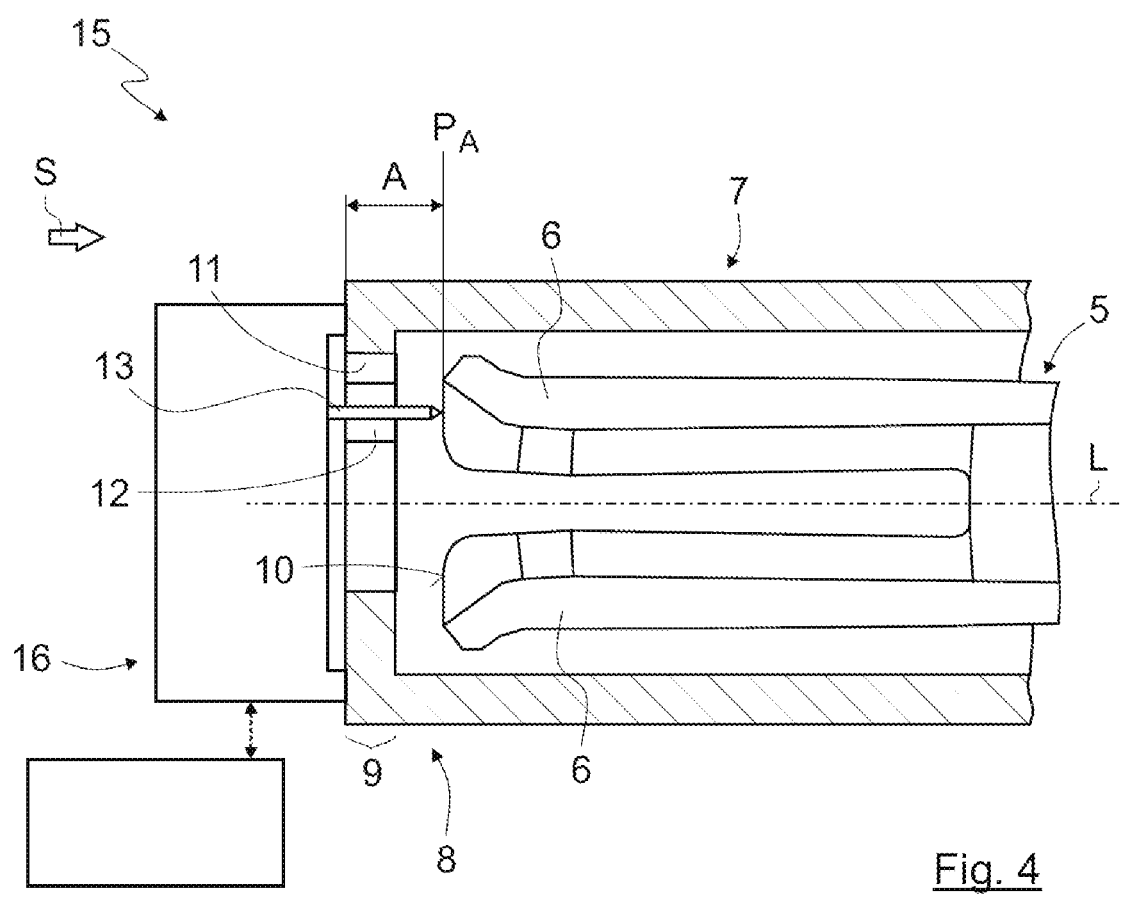

PROTECTION DEVICE FOR MECHANICALLY PROTECTING A CONTACT ELEMENT, AND MEASUREMENT METHOD AND MEASUREMENT ARRANGEMENT FOR THE ASSEMBLY OF AN ELECTRICAL PLUG-IN CONNECTOR

The present application claims the priority of German patent application No. 10 2021 111 255.9, the content of which is incorporated herein in full by reference.

The invention relates to a protection device for mechanically protecting at least one contact element of an electrical plug-in connector, having a protective cover for covering an end face of the contact element.

The invention further relates to an electrical plug-in connector for connecting to an electrical mating plug-in connector, having at least one contact element and a protection device for mechanically protecting the contact element.

The invention also relates to a measurement method for the assembly of an electrical plug-in connector, which, for mechanically protecting a contact element, has a protection device with a protective cover for covering an end face of the contact element.

The invention also relates to a measurement arrangement for the assembly of an electrical plug-in connector, which, for mechanically protecting a contact element, has a protection device with a protective cover for covering an end face of the contact element.

An electrical plug-in connector is known to produce an electrical connection with a corresponding electrical mating plug-in connector. Within the scope of the present invention, the plug-in connector or mating plug-in connector may be a connector, a panel connector, a PCB connector, a socket, a coupler or an adapter. The designation "plug-in connector" and "mating plug-in connector" respectively used within the scope of the invention are representative of all variants.

The mechanical and electrical requirements for electrical plug-in connectors, in particular within a vehicle, are now very high. For example, when operating a vehicle autonomously or using assistance systems, large amounts of data from multiple cameras, various sensors and navigation sources sometimes have to be combined and transported, usually in real time. The operation of many devices, screens and cameras accordingly requires a powerful infrastructure in the vehicle electronics.

In addition to the mechanical and electrical requirements mentioned, it is important—in order to save installation space and weight—to form the plug-in connectors as compactly as possible. In the pre-assembly of cables and in the manufacture of the components of the plug connection, compliance with the overall required tolerance ranges is comparatively demanding as a result.

When assembling an electrical plug-in connector, electrical conductors of an electrical cable or an electrical device (such as for example a printed circuit board) are typically connected to contact elements of the plug-in connector. Due to inaccuracies or tolerances in the manufacture of the plug-in connector components and in the assembly steps of the plug-in connector, in particular the axial distance between the front, connector-side end of an inner conductor contact element and a front end of an insulating contact element carrier (in the case of unshielded plug-in connectors) or an outer conductor contact element (in the case of shielded plug-in connectors) must be monitored and, if necessary, corrected. This distance, which determines the axial position of the contact element within the plug-in connector, is also referred to as the "connection dimension". For the correct assembly of the plug-in connector, it may be important to detect the axial position of the contact element, in particular to determine the connection dimension in order to ensure a sufficiently high quality of the plug-in connection.

In practice, the detection of the connection dimension or the axial position of the contact element within the plug-in connector by measurement typically takes place by way of a measuring probe, which is brought into connection with the front end face of the contact element in the plugging direction, that is to say from the "front". However, it is not possible to detect the axial position of the contact element from the front in the case of a plug-in connector that has a protection device for mechanically protecting the contact elements.

The protection device usually covers the axial end face of the contact element and therefore prevents the contact element from being damaged in the event of skewed or offset insertion of a mating contact element, for example by spring tabs being bent irreversibly. The protection device therefore allows the correct insertion of the mating contact element, but it blocks the accessibility of the end face. Such protection devices are provided in particular as part of so-called "Koshiri security" and are sometimes referred to as "Koshiri rings" or "Koshiri walls".

Detecting the axial position of the contact elements even in the case of plug-in connectors with such a protection device sometimes requires a great effort. Often, the axial position must be obtained by visual inspection through a viewing window arranged later-ally in the contact element carrier, plug-in connector housing or outer conductor contact element. However, such a viewing window may have adverse effects on the electrical properties of the plug-in connection and also require a comparatively large amount of installation space, which is contrary to the continual minimization of plug-in connectors. Also, visual detection through a viewing window is not always possible, since it may sometimes be blocked or covered.

In view of the known state of the art, the object of the present invention is therefore to provide a protection device which provides sufficient mechanical protection for a contact element of a plug-in connector and yet allows an advantageous and precise determination of the axial position of the contact element.

The present invention is also based on the object of providing an electrical plug-in connector which has a protection device which provides sufficient mechanical protection for a contact element of a plug-in connector and yet allows an advantageous and precise determination of the axial position of the contact element.

Finally, it is also the object of the invention to provide a measurement method and a measurement arrangement for an electrical plug-in connector which has a protective cover for mechanically protecting a contact element in order to reliably and accurately detect the axial position of a contact element during the assembly of the plug-in connector.

The features described below relate to advantageous embodiments and variants of the invention.

To the extent that the present description refers to the indication "front" (for example, "front end"), this indication of direction is to be understood as referring to the "connector-side end" or the "free end" of the plug-in connector that is facing the mating plug-in connector in the case of a later closed plug-in connection.

A protection device is provided for mechanically protecting at least one contact element of an electrical plug-in connector, having a protective cover for covering an end face of the contact element. The protective cover has an access opening for passing through a mating contact element of an electrical mating plug-in connector in order to electrically and mechanically connect the mating contact element to the contact element.

The protective cover covers at least some areas of the end face. Preferably, the protective cover almost completely covers the end face. It is particularly preferred, however, that the protective cover completely covers the end face.

Preferably, the protective cover covers the end face of the contact element in such a way that the mating contact element can still be plugged together with the contact element, but cannot damage the contact element by skewed or offset insertion. The mating contact element therefore cannot mechanically act on the end face of a spring tab of the contact element and therefore damage the spring tab.

Preferably, the protective cover completely covers the end face of the contact element.

The protection principle of the protection device is sometimes also referred to as "Koshiri security"; the protection device itself is also known as a "Koshiri ring" or "Koshiri wall".

The plug-in connector or the mating plug-in connector may, in principle, have any number of contact elements, but possibly only a single contact element. For example, the plug-in connector may have two contact elements, three contact elements, four contact elements, five contact elements, six contact elements, seven contact elements, eight contact elements or even more contact elements. The contact elements may run side by side or coaxially in relation to one another.

According to the invention, it is provided that the protective cover has in addition to the access opening at least one measuring access point, through which the axial position of the end face of the contact element can be detected by measurement, it being possible for a measuring tip of a measuring probe to be passed through the measuring access point in order to contact the end face of the contact element for detecting its axial position.

Preferably, the center axis of the access opening and/or the center axis of the measuring access point run in the axial direction of the contact element or in the plugging direction, preferably parallel to the longitudinal axis of the contact element.

The fact that, in addition to the access opening, at least one measuring access point is provided in the protective cover means that the axial position of the end face of the contact element can be advantageously determined from the front, that is to say along the plugging direction, by a sensor arrangement, for example a tactile sensor of a sensor arrangement.

The diameter of the measuring access point is preferably smaller than the diameter of the access opening, preferably smaller than the diameter of the access opening by a factor of 1.5 to 10, particularly preferably smaller than the diameter of the access opening by a factor of 2 to 5.

The protection device can continue to have its protective function, in particular if the lateral extent of the measuring access point or the diameter of the measuring access point is many times smaller than the lateral extent/the diameter of the access opening or than the diameter of the mating contact element. The measuring access point therefore preferably only exposes a comparatively small portion, in particular an angular segment, of the end face of the contact element. In this way, the mating contact element can still not damage the contact element in the event that the plugging operation is performed incorrectly. Nevertheless, advantageous measurement of the axial position, for example measurement of a connection dimension, can take place despite the presence of the protection device, without the need for a lateral viewing window.

If a number of contact elements are provided, a separate protective cover may be provided for each contact element. However, a common protective cover may also be provided for the end faces of a number of contact elements. For example, in this case the protective cover may have a number of access openings, preferably exactly one access opening per contact element. Each of these access openings may finally have at least one measuring access point to detect the axial position of the end face of the assigned contact element by measurement.

In an advantageous development of the invention, it may be provided that the protective cover is formed in a plate-shaped manner.

In principle, however, the protective cover can be formed as desired, for example also in grid-shaped or comb-shaped manner or by individual bars with sufficiently small spacing or pitch, so that the contact element blocks incorrect plugging of the mating contact element.

According to a development of the invention, it may be provided that the protective cover is formed from an electrically non-conductive material, preferably from a plastic.

In individual cases, however, it may also be provided that the protective cover is formed from an electrically conductive material, for example from a metal, in particular from a sheet metal.

It may be provided that the protective cover is formed as one part or in one piece with a contact element carrier, which guides and/or fixes the contact element or the contact elements in itself/themselves (also known by the term contact part carrier). The contact element carrier is preferably formed from an electrically insulating material. The protective cover may also be of one part or in one piece with a plug-in connector housing or—in particular in the case of an inner conductor contact element—one part with an outer conductor contact element of the plug-in connector. However, the protective cover may also be a component independent of the contact element carrier, the plug-in connector housing or the outer conductor contact element.

According to a development of the invention, it may be provided that the protective cover is formed by an area of a contact element carrier or plug-in connector housing of the plug-in connector that is arranged in front of the contact element in the plugging direction (that is to say in front of a connector-side area).

The protective cover may preferably be formed by an end-face end of the contact element carrier or of the plug-in connector housing.

In a development of the invention, it may be provided that the protective cover has two measuring access points, three measuring access points, four measuring access points or even more measuring access points, preferably per access opening.

The formation of a number of measuring access points can be advantageous for carrying out redundant measurements of the axial position of the respective contact element. In this way, for example, a tilting angle of the contact element can be determined or a determination of the axial position can take place even if the contact element is in an unsuitable orientation, which makes it not possible for the axial position to be detected by measurement through one of the measuring access points.

In a development of the invention, it may be provided that the measuring access points are arranged distributed along the circumference of the access opening.

The measuring access points may preferably be evenly spaced apart from one another along the circumference of the access opening. In principle, however, an uneven distribution is also possible.

In an advantageous development of the invention, it may be provided that at least one of the measuring access points goes over into the access opening.

The access opening and the measuring access points assigned to the access opening can therefore altogether form a common opening in the protective cover.

In a development of the invention, however, it may also be provided that at least one of the measuring access points is at a distance from the access opening.

The measuring access points and the access opening may therefore be arranged offset in relation to one another on a common surface of the protective cover.

In an advantageous development of the invention, it may be provided that the at least one measuring access point is formed as a slot, groove or bore. In principle, however, the measuring access point may be formed as any opening or clearance.

The at least one measuring access point may be formed as round, oval or rectangular (in particular square) or have some other geometry. For example, it may be provided that the cross section of the measuring access point corresponds, or at least substantially corresponds, to the cross section of the sensor to be passed through the measuring access point, for example to the cross section of a measuring probe or a measuring tip of a measuring probe of a tactile sensor.

In an advantageous development of the invention, it may be provided that the access opening and/or the at least one measuring access point has a funnel-shaped capturing area as an insertion aid for the measuring probe or the mating contact element.

The insertion of the contact element and/or the measuring probe or other sensor can therefore be facilitated.

The invention also relates to an electrical plug-in connector for connecting to an electrical mating plug-in connector. The plug-in connector has at least one contact element and a protection device, preferably a protection device according to the embodiments above and below. The protective cover of the protection device may be arranged in front of the contact element in the plugging direction, that is to say in front of a con-nector-side area of the contact element, in order to form a mechanical protection for the contact element.

The electrical plug-in connector is not limited to a specific type of plug-in connector, the invention being suitable in particular for plug-in connectors for high-frequency technology. This may in particular concern plug-in connectors or plug-in connections of the type PL, BNC, TNC, SMBA (FAKRA), SMA, SMB, SMS, SMC, SMP, BMS, HFM (FAKRA-Mini), H-MTD, BMK, Mini-Coax or MATE-AX. The present invention may be advantageously suitable for use with coaxial or differential plug-in connectors.

The plug-in connector according to the invention can be used particularly advantageously within a vehicle, in particular a motor vehicle. Possible areas of use are autonomous driving, driver assistance systems, navigation systems, "infotainment" systems, rear entertainment systems, Internet connections and Wireless Gigabit (IEEE 802.11ad standard). Possible applications include high-resolution cameras, for example 4K and 8K cameras, sensor technology, onboard computers, high-resolution screens, high-resolution dashboards, 3D navigation devices and mobile devices.

The plug-in connector according to the invention is suitable for any application within the electrical engineering overall and is not limited to use in vehicle technology.

In an advantageous development of the invention, it may be provided that at least one of the contact elements is formed as an inner conductor contact element. The invention is particularly advantageous for providing a protection device for protecting an inner conductor contact element.

If it has an inner conductor contact element, the electrical plug-in connector may optionally also have an outer conductor contact element, that is to say be formed as a shielded electrical plug-in connector. However, the electrical plug-in connector may also have only one or a number of inner conductor contact elements.

In a development of the invention, it may be provided that at least one of the contact elements is formed as an outer conductor contact element.

If the electrical plug-in connector has an outer conductor contact element, it preferably also has one or more inner conductor contact elements. One or more or all of the inner conductor contact elements may then each be encased by an outer conductor contact element.

It may be provided that the protection device has a protective cover for the at least one outer conductor contact element and at least one further protective cover for one or more inner conductor contact elements of the plug-in connector.

According to a development of the invention, it may be provided that the contact element has at least one spring tab.

Preferably, the contact element (for example an inner conductor contact element or an outer conductor contact element) is formed as a spring cage formed by at least two spring tabs.

However, other types of contact elements may also be well suited for use with the invention. However, the invention is particularly well suited for use with contact elements which have one or more spring tabs, since such spring tabs may sometimes be ex-posed to the risk of being damaged if the mating contact element is incorrectly inserted. Accordingly, the protection device according to the invention is particularly advantageously suitable for mechanically protecting such contact elements.

The end face of which the axial position is to be detected by measurement may be formed in particular by the front, free ends of the spring tabs of the contact element.

In an advantageous development of the invention, it may be provided that the protective cover has exactly one access opening per contact element.

In particular, it may be provided that the plug-in connector has a protective cover for all of the inner conductor contact elements, an access opening for passing through the corresponding mating contact element being provided in the protective cover for each inner conductor contact element.

Preferably, the access opening is arranged coaxially in relation to the corresponding contact element.

According to a development of the invention, it may also be provided that the protective cover has at least one measuring access point more per contact element than the contact element has spring tabs.

It may be provided in particular that a number of the measuring access points are arranged in groups, each of the groups being assigned to one of the contact elements or one of the access openings.

In particular, if the contact element has spring tabs, it may happen that the contact element has a random orientation in which a gap existing between the spring tabs is positioned directly behind a measuring access point. It is then not readily possible to detect the axial position of the end face of the contact element through this particular measuring access point. As a result, the contact element would first have to be twisted. In order to avoid this actuating effort, a number of measuring access points may be provided. If the number of measuring access points is greater than the number of spring tabs, it is at least possible in every case for the axial position to be detected through one of the measuring access points.

In addition, when using a number of measuring access points, a redundant measurement can also take place in order to increase the accuracy (for example by averaging the individual values) or if need be to detect a tilting angle of the contact element.

The orientation of the contact element may possibly also be detectable. For example, if it is not possible to detect the position through one or more of the measuring access points, it can be inferred that there is a gap in the spring tabs behind this measuring access point. This information can then be used if necessary to determine the current orientation of the contact element.

In an advantageous development of the invention, it may be provided that the at least one measuring access point is formed and arranged on the protective cover such that at least one measuring portion of the end face of the contact element is accessible for a tactile sensor through the measuring access point along the plugging direction parallel to the longitudinal axis of the contact element. The at least one measuring access point may be arranged in line with the measuring portion.

However, a possibility of oblique or angular access point for the tactile sensor may also be possible. It is essential that the measuring access point gives the tactile sensor access to the end face or to a measuring portion of the end face of the contact element suitable for the measurement in a manner suitable for the measurement.

In an advantageous development of the invention, it may be provided that the measuring portion is a portion of the end face that is aligned orthogonally in relation to the longitudinal axis of the contact element.

In particular, a measuring portion on the end face that is aligned orthogonally in relation to the longitudinal axis of the contact element may be advantageous in order to allow the most precise and error-free detection of the axial position.

The invention also relates to a plug-in connection having the plug-in connector according to the embodiments above and below, and the corresponding mating plug-in connector with the at least one mating contact element.

In addition, the invention relates to a measurement method for the assembly of an electrical plug-in connector, which, for mechanically protecting at least one contact element, has a protection device with a protective cover for covering an end face of the contact element (in some areas, almost completely or completely), the protective cover having an access opening for passing through a mating contact element of an electrical mating plug-in connector in order to electrically and mechanically connect the mating contact element to the contact element. It is provided that the axial position of the end face of the contact element is detected by measurement through a measuring access point arranged in addition to the access opening in the protection device, by the end face of the contact element being contacted with a measuring tip of a measuring probe.

In an advantageous manner, a measurement method by which the axial position of the end face of the contact element can be detected by measurement from the front even in case of Koshiri protection, for example to determine the connection dimension.

The measurement may preferably take place after the contact element has already been assembled, in particular has been assembled within a contact element carrier, plug-in connector housing and/or outer conductor contact element.

In a development of the invention, it may be provided that the axial position of the end face of the contact element relative to an adjacent, end-face end of a contact element carrier of the plug-in connector or a plug-in connector housing of the plug-in connector is detected in order to determine a connection dimension of the contact element within the plug-in connector.

In particular, the so-called connection dimension is advantageously suitable for ensuring the axial position of the contact element within the plug-in connector to be pre-assembled or assembled. In principle, however, the axial position of the end face of the contact element may also be detected relative to other plug-in connector components, for example relative to a supporting sleeve or some other plug-in connector component. The determination of the axial position in relation to an absolute coordinate system of a corresponding measurement arrangement may also be provided.

In an advantageous development of the invention, it may be provided that the axial position of the end face of the contact element is detected in order to determine a rotational orientation of the contact element within the plug-in connector.

In particular, the position of axial slots between spring tabs of the contact element may be determined in order to infer the rotational orientation of the contact element as a whole.

According to a development of the invention, it may also be provided that the axial position of the end face of the contact element is detected in order to determine a tilting angle of the contact element with respect to the longitudinal axis of the plug-in connector. In an advantageous manner, the coaxiality of the contact element can therefore also be determined.

For example, the formation of three or more measuring access points allows a three-point or multi-point measurement to be carried out in order to determine a misalignment of the contact element within the contact element carrier.

The tilting angle of the contact element can be determined in particular by sequential or simultaneous detection of the axial position through a number of measuring access points if the respectively detected lengths or positions differ.

According to a development of the invention, it may be provided that the axial position of the end face of the contact element is determined sequentially or simultaneously through a number of measuring access points of the protective cover.

Each of the two possibilities can offer corresponding advantages. Thus, sequential detection can keep the costs for the corresponding measurement arrangement low, since just a single sensor arrangement may be sufficient for detecting the axial position of the contact element. Nevertheless, the measurement time may be increased as a result of the sequential measurements, and therefore the throughput in the course of mass production may be reduced. Simultaneous detection, on the other hand, may reduce measurement time, at the expense of increased complexity of the measurement arrangement.

The invention also relates to an assembly method for the assembly of an electrical plug-in connector, which, for mechanically protecting at least one contact element, has a protection device with a protective cover for covering an end face of the contact element, the protective cover having an access opening for passing through a mating contact element of an electrical mating plug-in connector in order to electrically and mechanically connect the mating contact element to the contact element.

Within the assembly method, it may be provided to detect the axial position of the end face of the contact element by means of the measurement method described above and below.

Within the assembly method, it may also be provided that the position, the orientation and/or the tilting angle of the contact element is adapted as need be, depending on the determined axial position of the end face of the contact element.

The adaptation may take place in the course of open-loop and/or closed-loop control. For example, the axial position of the end face of the contact element may be determined continuously during the positioning of the contact element. However, the detection of the axial position of the end face of the contact element may only take place for control or documentation purposes after delivery, for example to trigger a one-time automatic correction, to advise a technician to manually correct the axial position or to exclude the corresponding plug-in connector from further processing.

The invention also relates to a measurement arrangement for the assembly of an electrical plug-in connector, which, for mechanically protecting at least one contact element, has a protection device with a protective cover for covering an end face of the contact element (in some areas, almost completely or completely), the protective cover having an access opening for passing through a mating contact element of an electrical mating plug-in connector in order to electrically and mechanically connect the mating contact element to the contact element. The measurement arrangement has a sensor arrangement for detecting the axial position of the end face of the contact element through a measuring access point arranged in addition to the access opening in the protection device.

In principle, any sensor arrangement may be provided. The sensor assembly may for example have an optical, capacitive or inductive sensor. For example, a laser distance measurement, an ultrasonic measurement and/or a millimeter wave measurement may be provided.

It is provided that the sensor arrangement has at least one tactile sensor.

The tactile sensor has a measuring probe with a measuring tip. The measuring tip of the probe can be passed through the measuring access point in order to contact the end face of the contact element for detecting its axial position.

According to a development of the invention, it may be provided that the cross section of the measuring access point corresponds, or at least substantially corresponds, to the cross section of the measuring tip or the cross section of the measuring probe.

Preferably, the cross section of the measuring access point or the lateral extent of the measuring access point is dimensioned such that a smooth passage of the measuring tip is possible.

If the cross section of the measuring access point corresponds, or at least substantially corresponds, to the cross section of the measuring tip, the measuring access point can provide an advantageous guide for the measuring tip and optionally also allow an orthogonal alignment of the measuring tip in relation to the end face of the contact element.

The measurement arrangement may also have a control device, which evaluates the data acquired by means of the sensor arrangement and, if necessary, can activate an actuator device.

The control device may be formed as a microprocessor. Instead of a microprocessor, any other device may be provided for implementing the control device, for example one or more arrangements of discrete electrical components on a printed circuit board, a programmable logic controller (PLC), an application-specific integrated circuit (ASIC) or some other programmable circuit, for example also a field programmable gate array (FPGA), a programmable logic arrangement (PLA) and/or a commercially available computer.

The control device may be suitable in particular for carrying out the measurement method for the assembly of the electrical plug-in connector. In particular, it may be provided that a computer program is executed on the control device, comprising control commands which, in the execution of the program, cause the control device to carry out the measurement method.

The invention also relates to a device for the assembly of an electrical plug-in connector, having a measurement arrangement according to the embodiments above and below, and an actuator device for axially positioning a contact element of the plug-in connector.

The actuator device may have one or more gripper units, which are capable of fixing the contact element for axial transport.

Preferably, the actuator device is electrically connected to the sensor arrangement for detecting the axial position of the end face of the contact element in order if need be to adapt the axial position of the contact element.

Features which have been described in conjunction with one of the subjects of the invention, specifically in the form of the protection device according to the invention, the plug-in connector, the plug-in connection, the measurement method, the measurement arrangement, the assembly method and the device, can also be advantageously implemented for the other subjects of the invention. Similarly, advantages that have been mentioned in conjunction with one of the subjects of the invention can also be under-stood as relating to the other subjects of the invention.

In addition, it is noted that expressions such as "comprising", "having" or "with" do not exclude any other features or steps. Furthermore, expressions such as "a", "an" or "the" which refer to a single number of steps or features do not exclude a plurality of features or steps, and vice versa.

In a puristic embodiment of the invention, however, it may also be provided that the features introduced in the invention by the terms "comprising", "having" or "with" constitute an exhaustive list. Accordingly, within the context of the invention, one or more lists of features may be considered as self-contained. The invention can for example consist exclusively of the features specified herein.

It should be mentioned that designations such as "first" or "second" etc. are used primarily for the purposes of being able to make a distinction between respective device or method features and are not necessarily intended to indicate that features require one another or are related to one another.

It should also be emphasized that the values and parameters described in the present document include deviations or fluctuations of ±10% or less, preferably ±5% or less, further preferably ±1% or less, and most particularly preferably ±0.1% or less in the respectively mentioned value or parameter, provided that these deviations are not ruled out when implementing the invention in practice. The specification of ranges by way of start and end values also comprises all those values and fractions that are included by the respectively mentioned range, in particular the start and end values and a respective mean value.

Exemplary embodiments of the invention will be described in more detail below with reference to the drawings.

The figures each show preferred exemplary embodiments in which individual features of the present invention are illustrated in combination with one another. Features of one exemplary embodiment can also be implemented in isolation from the other features of the same exemplary embodiment and can accordingly be readily combined with features of other exemplary embodiments by a person skilled in the art to form further expedient combinations and sub-combinations.

Functionally identical elements are provided with the same reference signs in the figures.

In the figures, schematically:

FIG. 3 shows a front view of the protection device of the plug-in connector of FIG. 1;

FIG. 4 shows a measurement arrangement according to the invention during the detection of the axial position of the end face of a contact element incorporated in the contact element carrier of the plug-in connector of FIG. 1, in a sectional representation corresponding to the section line IV of FIG. 3;

Figure 1:
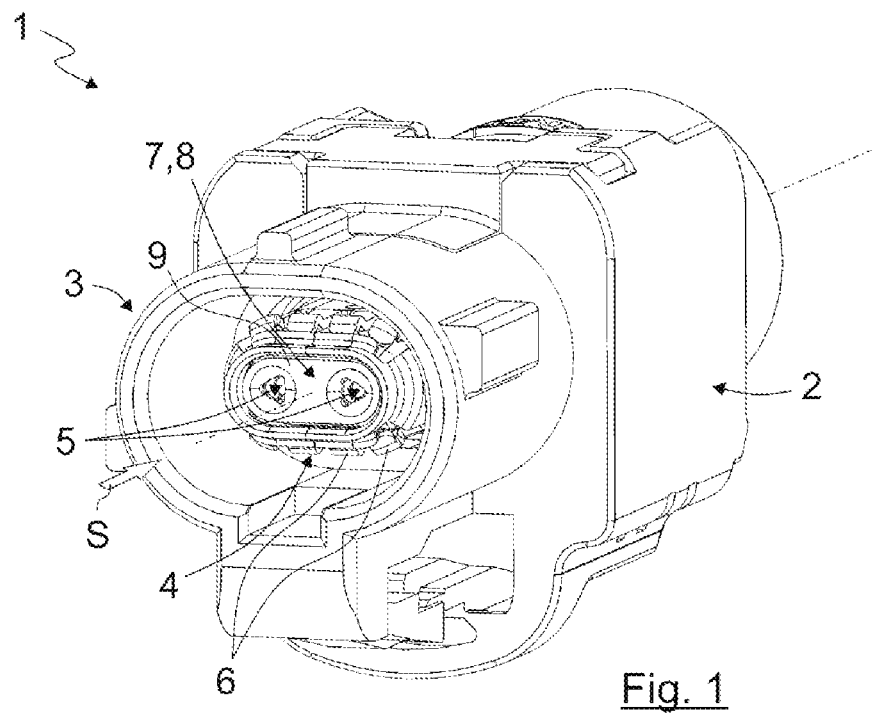
FIG. 1 shows a plug-in connector according to the invention with a protection device for mechanically protecting the inner conductor contact elements of the plug-in connector in a perspective representation.

FIG. 1 shows an electrical plug-in connector 1 according to the invention in a perspective representation. The plug-in connector 1, which should be understood as only given by way of an example, is formed as a cable plug-in connector. In principle, how-ever, the invention may also be advantageously suitable for use with adapter plug-in connectors, PCB plug-in connectors or other plug-in connectors.

The plug-in connector 1 has an electrically insulating plug-in connector housing 2, with a front end 3, which is provided for contacting a corresponding mating plug-in connector (not shown). The mating plug-in connector can be inserted into the plug-in connector 1 along a plugging direction S. The plug-in connector 1 or the plug-in connector housing 2 may in a usual manner have locking elements, elements for mechanical coding, etc., which however are not discussed in more detail here.

By way of example, the electrical plug-in connector 1 shown has three contact elements 4, 5: one outer conductor contact element 4 and two inner conductor contact elements 5 encased by the outer conductor contact element 4 (cf. also in particular FIGS. 2 to 5). However, the invention should not be understood as limited to this; in principle, an unshielded plug-in connector may also be provided (i.e. a plug-in connector without an outer conductor contact element 4). There may, in principle, also be any number of inner conductor contact elements 5.

The outer conductor contact element 4 is formed as a spring cage comprising a number of individual spring tabs 6 and arranged running around an electrically insulating contact element carrier 7 in a ring-shaped manner. The inner conductor contact elements 5 are incorporated in the contact element carrier 7 and in the exemplary embodiments also have spring tabs 6 for forming a spring cage. By way of example, the inner conductor contact elements 5 each have exactly two spring tabs 6 (cf. for example FIG. 3).

Figure 2:
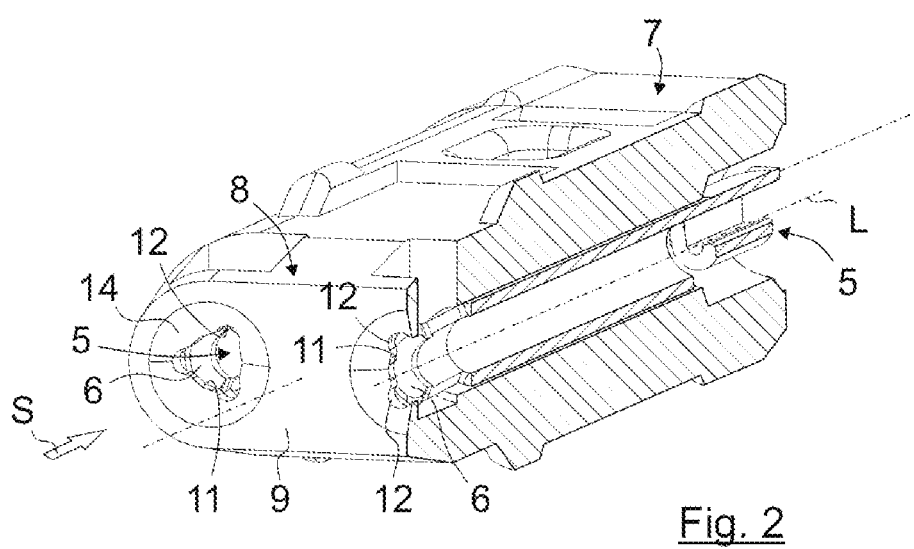
FIG. 2 shows a perspective sectional representation through a contact element carrier of the plug-in connector of FIG. 1.

For better representation, the contact element carrier 7 is shown separately in FIG. 2 in a perspective sectional representation through one of the inner conductor contact elements 5. FIG. 3 shows a simplified front view of the contact element carrier 7.

The electrical plug-in connector 1 has a protection device 8 for mechanically protecting the inner conductor contact elements 5. The protection device 8 is primarily formed by a protective cover 9 formed as one part or in one piece with the contact element carrier 7 to cover an end face 10 of the inner conductor contact element 5 (cf. in particular FIG. 4 or 5). The protective cover 9 of the protection device 8 is preferably formed from an electrically non-conductive material and arranged in front of the inner conductor contact element 5 in the plugging direction, that is to say in front of a connector-side area of the inner conductor contact element 5. The protection device 8 shown is formed by way of example in a plate-shaped manner.

At this point it should be mentioned that alternatively or additionally a protection device 8 or protective cover 9 for the outer conductor contact element 4 may be provided, but is not shown in the exemplary embodiments for simplification.

The protective cover 9 has for each of the inner conductor contact elements 5 an access opening 11 for passing through a mating contact element of the mating plug-in connector in order to electrically and mechanically connect the mating contact element to the inner conductor contact element 5. The access opening 11 is arranged coaxially in relation to the corresponding inner conductor contact element 5. The fact that the access opening 11 has a correspondingly suitable diameter to cover the end face 10 of the inner conductor contact element 5 but still allow insertion of the mating contact element means that skewed or otherwise incorrect insertion of the mating contact element cannot lead to damage to the inner conductor contact elements 5.

At this point it should be mentioned that the protection device 8 shown here should only be understood as given by way of example. In particular, the protective cover 9 does not have to be formed as one part or in one piece with the contact element carrier 7. The protective cover 9 may for example also be formed by the plug-in connector housing 2 or—in individual cases—also by the outer conductor contact element 4.

In particular, within the assembly of the plug-in connector 1, it may be necessary to detect the axial position $P_A$ of the end face 10 of a contact element 4, 5 by measurement, for example to determine the so-called connection dimension A, that is to say the front distance of the contact element 4, 5 from a front end of a plug-in connector component surrounding the contact element, that is to say for example of the contact element carrier 7 (cf. FIG. 4), of the outer conductor contact element 4 or of the plug-in connector housing 2.

Since the protective cover 9 covers the end face 10 of the inner conductor contact element 5, it is proposed to provide in the protective cover 9 in addition to the access opening 11 at least one measuring access point 12, through which the axial position $P_A$ of the end face 10 of the inner conductor contact element 5 can finally be detected by measurement. In principle, any number of measuring access points 12 per contact element 4, 5 or per access opening 11 may be provided for this purpose, for example exactly one measuring access point 12, but preferably two measuring access points 12, three measuring access points 12, four measuring access points 12 or even more measuring access points 12.

In order to ensure that, in the case of a random orientation of the inner conductor contact element 5 within the contact element carrier 7, the axial slots between the spring tabs 6 are not positioned directly behind the measuring access point 12, and therefore make detection of the end face 10 by measurement impossible, it may be provided in particular that the protective cover 9 has more measuring access points 12 per inner conductor contact element 5 than the inner conductor contact element 5 has spring tabs 6. In this way it can be ensured that the possibility of detecting the end face 10 of the contact element 4, 5 is always provided at least through one of the measuring access points 12.

The measuring access points 12 may be arranged distributed along the circumference of the access opening 11, in particular evenly spaced apart from one another, as can be seen in FIG. 3. Preferably, it is also provided that the measuring access points 12 go over into the access opening 11, that is to say form a common opening in the protective cover 9 with the access opening 11. The measuring access points 12 may be formed as slots, grooves or bores.

FIGS. 6 to 11 show various other protective covers 9 by way of example, with different measuring access points 12 in the sense of the present invention. It should be made clear here in particular that, in principle, there may be any number of measuring access points 12. Also, an even spacing along the circumference of the access opening 11 is not necessarily required (cf. for example FIGS. 7, 8 and 11).

Figure 9:
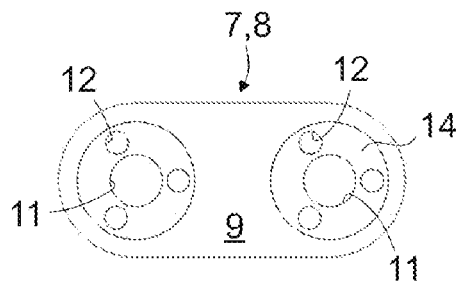
FIG. 9 shows a front view of a protection device according to a fifth exemplary embodiment.
Figure 10:
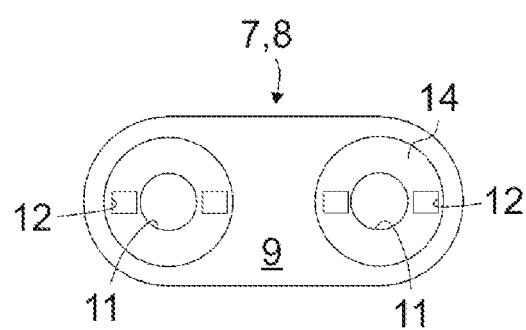
FIG. 10 shows a front view of a protection device according to a sixth exemplary embodiment.
Figure 11:
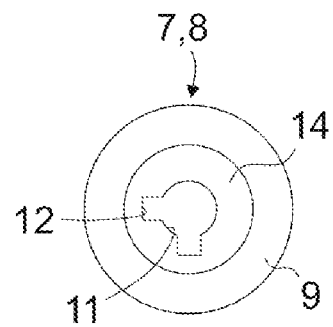
FIG. 11 shows a front view of a protection device according to a seventh exemplary embodiment.

In FIGS. 9 and 10, it is intended to show that it is also not required that the measuring access points 12 go over into the access opening 11. The measuring access points 12 may therefore, in principle, also be at a distance from the access opening 11. FIGS. 3 and 6 to 11 also show by way of example different geometrical configurations of the measuring access points 12.

In order to provide an insertion aid for a measuring probe 13 for example and/or for the mating contact element, it may optionally be provided that the access opening 11 and/or the at least one measuring access point 12 has a funnel-shaped capturing area 14 (cf. for example FIG. 2).

FIG. 4 shows a measurement arrangement 15 by way of example for the assembly of the electrical plug-in connector 1. The contact element carrier 7 or the protection device 8 is shown in a lateral sectional view.

The measurement arrangement 15 has a sensor arrangement 16 for detecting the axial position $P_A$ of the end face 10 of the contact element 4, 5 through the measuring access point 12. The sensor arrangement 16, to be understood as only given by way of an example, comprises a tactile sensor, in the exemplary embodiment a measuring probe 13 with a measuring tip, which is passed through the measuring access point 12 to mechanically contact the end face 10 of the inner conductor contact element 5 for detecting its axial position $P_A$. The feeding of the measuring probe 13 or the measuring tip may take place parallel to the longitudinal axis L of the inner conductor contact element 5 through the measuring access point 12 in order to contact a corresponding measuring portion of the end face 10. The measuring portion is preferably a portion of the end face that is aligned orthogonally in relation to the longitudinal axis L of the contact element 4, 5. In this way, even in the case of a radial displacement of the sensor arrangement 16, an accurate measurement can nevertheless take place.

It may also be advantageous if the cross section of the measuring access point 12 corresponds, or at least substantially corresponds, to the cross section of the measuring tip or the measuring probe 13, since then a suitable guide for the measuring access point 13 or for the measuring tip can be provided.

If the axial position $P_A$ of the end face 10 of the inner conductor contact element 5 is to be detected within a corresponding measurement method relative to the adjacent end-face end of the contact element carrier 7, of the plug-in connector housing 2 or of the outer conductor contact element 4 in order to determine the connection dimension A of the inner conductor contact element 5 within the plug-in connector 1, a single measurement through a single measuring access point 12 may, in principle, be sufficient, as long as an axial gap between the spring tabs 6 does not happen to be arranged behind this measuring access point 12. In this case, a sensor arrangement 16 with a single measuring probe 13 (or some other sensor) may therefore be sufficient. If the measurement is not successful, renewed measurement can then be carried out through another measuring access point 12.

Figure 5:
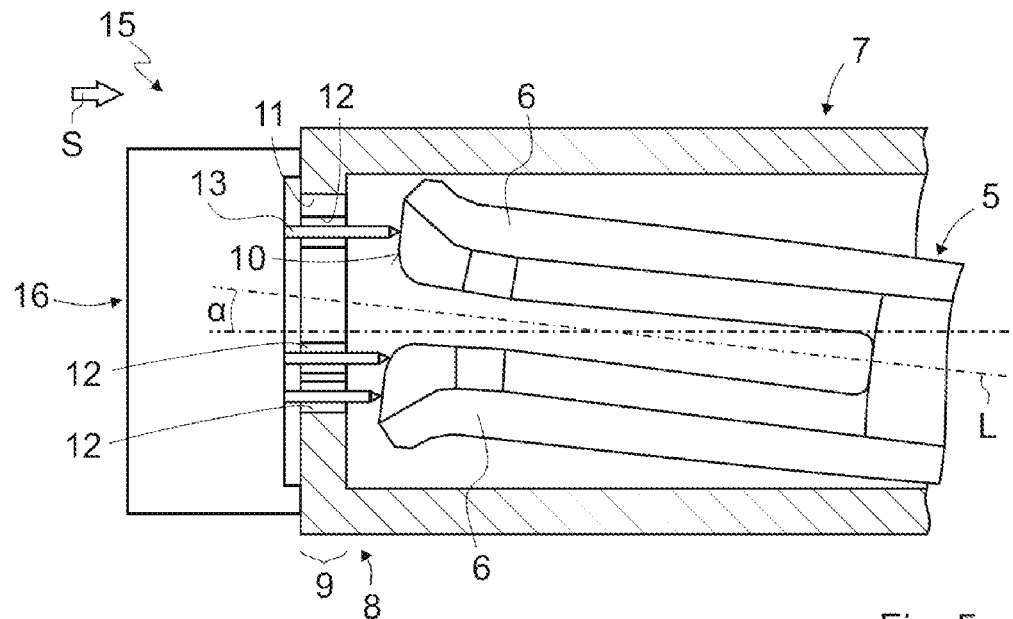
FIG. 5 shows a further measurement arrangement according to the invention for detecting a tilting angle of the contact element.
Figure 6:
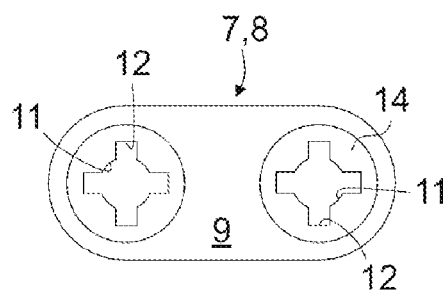
FIG. 6 shows a front view of a protection device according to a second exemplary embodiment.
Figure 7:
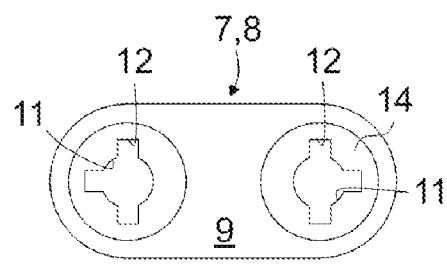
FIG. 7 shows a front view of a protection device according to a third exemplary embodiment.
Figure 8:
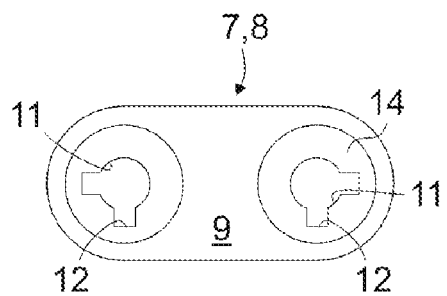
FIG. 8 shows a front view of a protection device according to a fourth exemplary embodiment.

When using a number of measuring access points 12, however, a tilting angle α of the inner conductor contact element 5 may possibly be determined with respect to the longitudinal axis of the plug-in connector 1, as indicated in FIG. 5. In FIG. 5, a sensor arrangement 16 with three tactile sensors or with three measuring probes 13 in order to allow simultaneous measurement through the three measuring access points 12 is shown by way of example. In principle, the tilting angle α may however also be obtained by sequential detection by means of a sensor arrangement 16 according to FIG. 4.

At this point it should be mentioned that, by sequential or simultaneous measurement, the rotational orientation of the inner conductor contact element 5 within the contact element carrier 7 may possibly also be determined, since the position of the axial slots between the spring tabs 6 may possibly be detectable.

The measurement arrangement 15 may optionally have one or more actuator devices to position the contact element 4, 5 or the contact elements 4, 5 or other plug-in connector components of the plug-in connector 1 relative to one another. However, an actuator device is not shown in the figures.

Figure 12:
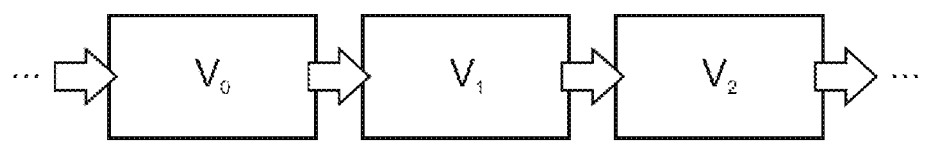
FIG. 12 shows a measurement method according to the invention.

By way of example, a measurement method for the assembly of the electrical plug-in connector 1 is indicated in FIG. 12. The measurement method comprises at least the primary method step $V_1$, according to which the axial position $P_A$ of the end face 10 of the contact element 4, 5 is detected by measurement through the measuring access point 12 arranged in addition to the access opening 11 in the protection device 8. Optionally, in a previous method step $V_0$, the contact element 4, 5 may be positioned within the contact element carrier 7. Again optionally, once the axial position $P_A$ of the end face 10 of the contact element 4, 5 has been detected, a correction of the axial position $P_A$, rejection of the plug-in connector 1, instruction to a technician or documentation may be provided in a subsequent method step $V_2$.

Within the method according to the invention, further method steps may also be provided. The flow diagram described on the basis of FIG. 12 should to be understood as merely given by way of example.

The invention claimed is:

1. A protection device for mechanically protecting a contact element of an electrical plug-in connector, the protection device comprising a protective cover for covering a front end face of the contact element, the protective cover comprising (i) an access opening for passing through a mating contact element of an electrical mating plug-in connector in order to electrically and mechanically connect the mating contact element to the contact element, and (ii) an at least one measuring access point for passing through a measuring tip of a measuring probe along an axial direction in order to contact the front end face of the contact element, to detect an axial position (PA) of the front end face of the contact element.

2. The protection device as claimed in claim 1, wherein the protective cover is formed in a plate-shaped manner.

3. The protection device as claimed in claim 1, wherein the protective cover is formed from an electrically non-conductive material.

4. The protection device as claimed in claim 1, wherein the protective cover is formed by an area of at least one of (i) a contact-element carrier and (ii) a plug-in connector housing of the plug-in connector, that is arranged in front of the contact element in a plugging direction(S).

5. The protection device as claimed in claim 1, wherein the at least one measuring access point comprises a plurality of access points arranged distributed along a circumference of the access opening.

6. The protection device as claimed in claim 1, wherein the at least one-measuring access point goes over into the access opening.

7. The protection device as claimed in claim 1, wherein the at least one measuring access point is at a distance from the access opening.

8. An electrical plug-in connector including:
a contact element, and
a protection device, for mechanically protecting the contact element, the protection device comprising a protective cover covering a front end face of the contact element,
wherein the protective cover includes
    (i) an access opening for passing through a mating contact element of an electrical mating plug-in connector in order to electrically and mechanically connect the mating contact element to the contact element, and
    (ii) an at least one measuring access point for passing through a measuring tip of a measuring probe along an axial direction in order to contact the front end face of the contact element, to detect an axial position (PA) of the front end face of the contact element,
    wherein the protective cover is arranged in front of the contact element in a plugging direction(S).

9. The electrical plug-in connector as claimed in claim 8, wherein the contact element has at least one spring tab.

10. The electrical plug-in connector as claimed in claim 8, wherein the contact element comprises a plurality of contact elements,
    wherein the access opening comprises a plurality of access openings, and
    wherein the protective cover has one access opening per contact element.

11. The electrical plug-in connector as claimed in claim 9, wherein the contact element comprises a plurality of contact elements,
    wherein the at least one measuring access point comprises a plurality of measuring access points, and
    wherein the protective cover has at least one measuring access point more per contact element than the contact element has spring tabs, the plurality of measuring access points being arranged in groups, and each of the groups being assigned to a corresponding contact element of the plurality of contact elements.

12. The electrical plug-in connector as claimed in claim 8, wherein an at least one measuring portion of the front end face of the contact element is in line with the at least one measuring access point.

13. The electrical plug-in connector as claimed in claim 12, wherein the at least one measuring portion is a portion of the front end face that is aligned orthogonally in relation to a longitudinal axis (L) of the contact element.

14. A measurement method for measuring an electrical plug-in connector comprising a contact element and a protection device, the protection device including a protective cover for covering a front end face of the contact element, the protective cover including (i) a measuring access point and (ii) an access opening for passing through a mating contact element of an electrical mating plug-in connector in order to electrically and mechanically connect the mating contact element to the contact element,
the method comprising the step of:
    passing a measuring tip of a measuring probe through the measuring access point along an axial direction in order to contact the front end face of the contact element, and detecting an axial position (PA) of the front end face of the contact element.

15. The measurement method as claimed in claim 14, wherein the axial position (PA) of the front end face of the contact element, relative to at least one of (i) an adjacent end-face end of a contact element carrier of the plug-in connector and (ii) a plug-in connector housing of the plug-in connector, is detected in order to determine a connection dimension (A) of the contact element within the plug-in connector.

16. The measurement method as claimed in claim 14, wherein the axial position (PA) of the front end face of the contact element is detected in order to determine a rotational orientation of the contact element within the plug-in connector.

17. The measurement method as claimed in claim 14, wherein the axial position (PA) of the front end face of the contact element is detected in order to determine a tilting angle (α) of the contact element with respect to a longitudinal axis of the plug-in connector.

18. The measurement method as claimed in claim 14, wherein the measuring access point comprises a plurality of measuring access points, and wherein the axial position (PA) of the front end face of the contact element is determined using the plurality of measuring access points.

19. A measurement arrangement for measuring an electrical plug-in connector comprising a contact element and a protection device, the protection device including a protective cover for covering a front end face of the contact element, the protective cover including (i) a measuring access point and (ii) an access opening for passing through a mating contact element of an electrical mating plug-in connector in order to electrically and mechanically connect the mating contact element to the contact element, the measurement arrangement comprising:
a sensor arrangement for detecting an axial position (PA) of the front end face of the contact element through the measuring access point, the sensor arrangement including at least one tactile sensor configured to pass through the measuring access point along an axial direction in order to contact the front end face of the contact element.

20. The measurement arrangement as claimed in claim 19, wherein a cross section of the measuring access point substantially corresponds to at least one of a cross section of a measuring probe and a measuring tip of the measuring probe.

21. The protection device as claimed in claim 1, wherein the protective cover is a cap.

* * * * *